United States Patent
Wang

(10) Patent No.: US 11,854,182 B2
(45) Date of Patent: Dec. 26, 2023

(54) DIMENSIONAL MEASUREMENT METHOD BASED ON DEEP LEARNING

(71) Applicant: UnitX, Inc., San Jose, CA (US)

(72) Inventor: Kedao Wang, San Jose, CA (US)

(73) Assignee: UNITX, Inc., San Jose, CA (US)

( * ) Notice: Subject to any disclaimer, the term of this patent is extended or adjusted under 35 U.S.C. 154(b) by 330 days.

(21) Appl. No.: 17/411,339

(22) Filed: Aug. 25, 2021

(65) Prior Publication Data
US 2023/0061004 A1 Mar. 2, 2023

(51) Int. Cl.
| | | |
|---|---|---|
| G06T 7/00 | (2017.01) | |
| G06T 7/62 | (2017.01) | |
| G06T 7/73 | (2017.01) | |
| G06V 10/22 | (2022.01) | |
| G06V 10/82 | (2022.01) | |
| G06T 3/40 | (2006.01) | |
| B25J 11/00 | (2006.01) | |

(52) U.S. Cl.
CPC ............. G06T 7/0006 (2013.01); B25J 11/00 (2013.01); G06T 3/40 (2013.01); G06T 7/62 (2017.01); G06T 7/73 (2017.01); G06V 10/22 (2022.01); G06V 10/82 (2022.01); *G06T 2207/20084* (2013.01); *G06T 2207/30108* (2013.01); *G06T 2207/30164* (2013.01); *G06V 2201/06* (2022.01)

(58) Field of Classification Search
CPC ... G06T 7/60; G06T 7/62; G06T 2207/20081; G06T 2207/20084; G06T 7/0004–001; G06T 2207/30108–30164; G06T 3/40; G06T 7/73; G06N 3/02–0985; G06V 10/82; G06V 10/22–235; G06V 2201/06; G06V 10/255; G06V 10/422; G06V 10/25; G01B 11/00–306; B25J 11/00; Y02P 90/30

See application file for complete search history.

(56) References Cited

U.S. PATENT DOCUMENTS

2021/0241450 A1\* 8/2021 Kim .......................... G06T 7/50

FOREIGN PATENT DOCUMENTS

| WO | WO-2021177245 A1 * | 9/2021 |
| WO | WO-2022070186 A1 * | 4/2022 |

OTHER PUBLICATIONS

Carion, Nicolas, et al. "End-to-end object detection with transformers." European conference on computer vision. Cham: Springer International Publishing, 2020. (Year: 2020).*

Růžička, Vít, and Franz Franchetti. "Fast and accurate object detection in high resolution 4K and 8K video using GPUs." 2018 IEEE High Performance extreme Computing Conference (HPEC). IEEE, 2018. (Year: 2018).*

Wang, Yuhao, et al. "High precision dimensional measurement with convolutional neural network and bi-directional long short-term memory (LSTM)." Sensors 19.23 (2019): 5302. (Year: 2019).*

\* cited by examiner

*Primary Examiner* — Geoffrey E Summers
(74) *Attorney, Agent, or Firm* — Travis Banta; Loyal IP Law, PLLC

(57) ABSTRACT

The present disclosure provides a dimensional measurement method and device based on deep learning. The method includes capturing a target image of a target object, obtaining measurement data for the target image, and determining whether or not the target object is within a preset tolerance.

4 Claims, 3 Drawing Sheets

DIMENSIONAL MEASUREMENT METHOD BASED ON DEEP LEARNING

TECHNICAL FIELD

The present disclosure relates to the technical field of industrial vision which includes a dimensional measurement method and device. The method and device may implement deep learning to iteratively improve dimensional measurement accuracy.

BACKGROUND

Industrial production, particularly production lines that utilize robotic assembly, benefits from a measurement of dimensions of parts or products. In related technologies, parts or products to be measured are captured in an image. Once the image is captured, the images for the parts or products are location by template matching to obtain locating results (e.g., where a part or product is location within a particular space). Based on the locating results, dimensional information of the parts and products can be determined. However, variations in the environment and materials reduce the repeatability and accuracy of positioning, thereby reducing the accuracy of the dimensional data obtained based on the locating results.

SUMMARY

To remedy the foregoing deficiencies in the prior art, the present disclosure proposes a dimensional measurement method and device based on deep learning.

According to one aspect of the present disclosure, a dimensional measurement method and device which incorporate deep learning are provided. For example a device or a system may execute a method, which comprises: capturing an image of a target object according to a preset location point to obtain an image, wherein the said preset location point indicates the imaging resolution of points used in measuring the target object; determining at least one target region from the image to be processed, where each target region includes at least one location point; processing at least one of the target regions using a pre-trained neural network to obtain the first position information of each location point; and determining dimensional data of the target object according to the location point and the first position information of each location point.

In a possible implementation, the neural network includes at least one sub-network, where the sub-network corresponds to the target region. The sub-network includes an encoder and a decoder, and the pre-trained neural network processes at least one target region to obtain the position information of each location point. Processing may comprise performing feature extraction on any target region by using the encoder in the sub-network corresponding to the target region to obtain a feature map of the said target region; processing the feature map by using the decoder in the sub-network corresponding to the target region to obtain position information of each location point in the target region.

In a possible implementation, the method may be used to determine at least one target region from the image to be processed. The method comprises: when the range of positions of the location points is known, and the number of location points used in measuring the target object is one location point, the region corresponding to the range of positions of the location point in the image to be processed is determined as the target region, wherein the range of positions indicates the smallest area where the location point appears in the field of view, and the field of view indicates the region captured when the image capture component captures an image of the target object.

In a possible implementation, determining at least one target region from the image to be processed further comprises: when the range of positions of the location points is known, and the number of location points used in measuring the target object is greater than one location point, determining multiple selection methods based on the range of positions of each location point; determining a total area of the target regions under the respective selection methods; setting the method that has the smallest total area as the target selection method; and determining at least one target region from the image to be processed by using the target selection method.

In a possible implementation, determining at least one target region from the image to be processed further comprises: when the range of positions of the location points is unknown, downsampling the image to be processed according to a preset downsampling ratio to obtain an intermediate image; determining, respectively, the second position information of each location point in the intermediate image; determining third position information of each location point in the image to be processed according to the second position information, wherein the third position information indicates the position of the location points in the image to be processed, when the location points information corresponds to the second position information; and determining at least one target region from the image to be processed, according to the third position information and the preset dimensions.

In a possible implementation, the method that captures the image of a target object according to a preset location precision to obtain an image to be processed comprises determining a field of view when capturing an image of the target object according to the preset location precision and imaging resolution; and capturing an image of the target object based on the field of view to obtain the image to be processed.

In a possible implementation, the method further comprises setting a minimum value of location precision of the multiple location points as the preset location precision when multiple location points are used in measuring the said target object.

In a possible implementation, the target object includes at least either an industrial part or an industrial product, and the dimensional data includes at least one of the following measurements: length, width, height, curvature, radians, or area.

According to another aspect of the present disclosure, there is provided a dimensional measurement device which incorporates deep learning, which comprises: an image capture component, which captures an image of a target object according to a preset location precision to obtain an image to be processed, wherein the location precision indicates the imaging resolution of the location points used in measuring the target object; a target region determination component, which determines at least one target region from the image to be processed, with each target region including at least one location point; a position information determination component, which processes at least one of the said target region using a pre-trained neural network to obtain the first position information of each location point; and a dimensional data determination component, which determines the dimensional data of the target object according to the location precision and the first position information of each location point.

According to another aspect of the present disclosure, there is provided a dimensional measurement device based on deep learning, the device comprising: a processor; a memory that stores instructions that are executable by the processor; wherein the processor executes instructions implementing any one of the methods described herein.

The embodiments of the present disclosure provide a processing device which captures an image of a target object according to the preset location precision to obtain an image; determines at least one target region from the image, where each target region includes at least one location point, identifies at least one target region by using a pre-trained neural network to obtain the first position information of each location point; and determines dimensional data of the target object according to the location precision and first position information of each location point. This method and device improve the repeatability and accuracy of locating and measuring a target object through deep learning, and in turn, improves the accuracy of the dimensional measurement result (the dimensional data of the target object).

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
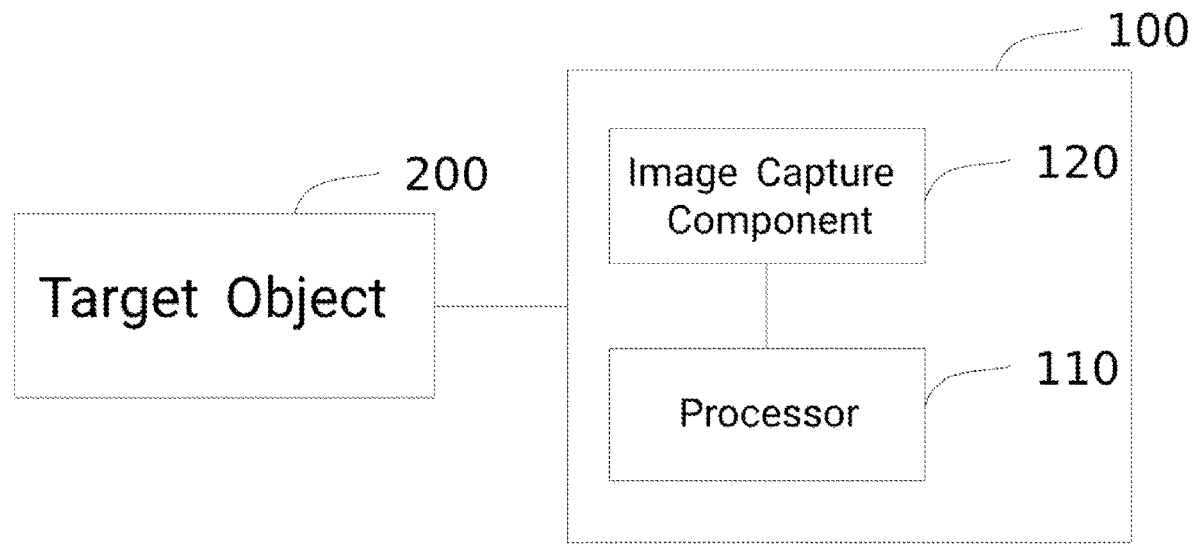
FIG. 1 illustrates a schematic diagram of an application of the dimensional measurement device based on deep learning according to an embodiment of the present disclosure.

The technical solutions in the embodiments of the present disclosure will be clearly and completely described below, accompanied by diagrams of embodiments. The described embodiments are only a part of the embodiments of the present disclosure, rather than all possible embodiments. Based on the embodiments of the present disclosure, all other embodiments obtained by those skilled in the art without creative work are contemplated by the present disclosure.

At present, dimensional measurements of parts or products in industrial production usually use template matching. In this method, an image of a target object (such as parts of industrial products like mobile phones or automobiles) is captured in a two-dimensional (2D) or three-dimensional (3D) image capture. A preset template may be used to match the 2D pixels or 3D voxels of the target object to obtain the location results. The dimensional data of the target object is determined based on these location results.

However, this method can be affected by environmental factors including inconsistent ambient light, inconsistent light sources, dusty environment, lens defect, sensor defects, and material inconsistency (different processing techniques or different texture). These environmental factors and material inconsistencies cause inconsistencies in captured images of target objects. Measuring target objects using inconsistent captured images of target objects reduces the repeatability and accuracy of target object positioning. Reduced repeatability and accuracy of target object positioning may cause template matching to fail given multiple possibilities for angles or views in the captured images. Dimensional data obtained under these circumstances frequently exhibits low accuracy.

Other techniques that have been used for measuring parts or products use recognition based on manually identified features. For example, a method may first define feature points of the object to be measured by manually identified edges and corners. These techniques capture an image of the target object and causes a processor to identify the manually identified feature points in the image. Based on the positions of the feature points, these techniques are used to locate the target object and determines the dimensional data based on the locating results.

However, this method is not only affected by environmental and material factors, but also greatly depends on the expertise of visual engineers. For example, when the target object uses a new material, visual engineers manually identify feature points of the target object. However, manual identification slows the speed of a dimensional measurement function. In addition, when feature points of the target object are obscure, this method cannot determine the specific positions of the feature points from a global perspective, resulting in low accuracy of the obtained dimensional data.

To solve the above technical problems, the present disclosure provides a dimensional measurement method and device based on deep learning. The embodiments of the present disclosure captures an image of the target object according to the preset location precision to obtain the image; determines at least one target region from the image to be processed, with each target region includes at least one location point; identifies at least one target region by using a pre-trained neural network to obtain the first position information of each location point, and determines the dimensional data of the target object according to the location precision and the first position information of each location point, thereby improving the repeatability and accuracy of locating and measuring the target object through deep learning. This embodiment improves the accuracy of the dimensional measurement result (the dimensional data of the target object).

FIG. 1 illustrates a schematic diagram of an application of the dimensional measurement method based on deep learning according to an embodiment of the present disclosure. As shown in FIG. 1, the dimensional measurement method based on deep learning is applied to an electronic device 100, which includes a processor 110 and an image capture component 120.

The electronic device 100 may be a server, a desktop computer, a mobile device, or any other computing device that includes a processor 110 and an image capture component 120. The present disclosure does not limit the specific type of the electronic device 100.

The image capture component 120 may be a device capable of capturing an image of target object 200. For example, the device may be a camera or a webcam. The present disclosure does not limit the specific type of image capture component 120.

The processor 110 may capture an image of target object 200 by using image capture component 120 according to the preset location precision to obtain an image, where each target region includes at least one location point. The processor may identify at least one target region by using a pre-trained neural network to obtain the position information of each location point and determine dimensional data of the target object according to the location precision and the first position information of each location point.

Processor 110 may be a general-purpose processor, such as a central processing unit (CPU), or an intelligence processing unit (IPU). An IPU may be one or more of the following: graphics processing unit (GPU), neural-network processing unit (NPU), digital signal processor (DSP), field programmable gate array (FPGA), and application-specific integrated circuit (ASIC). The present disclosure does not limit the specific type of processor 110.

Figure 2:
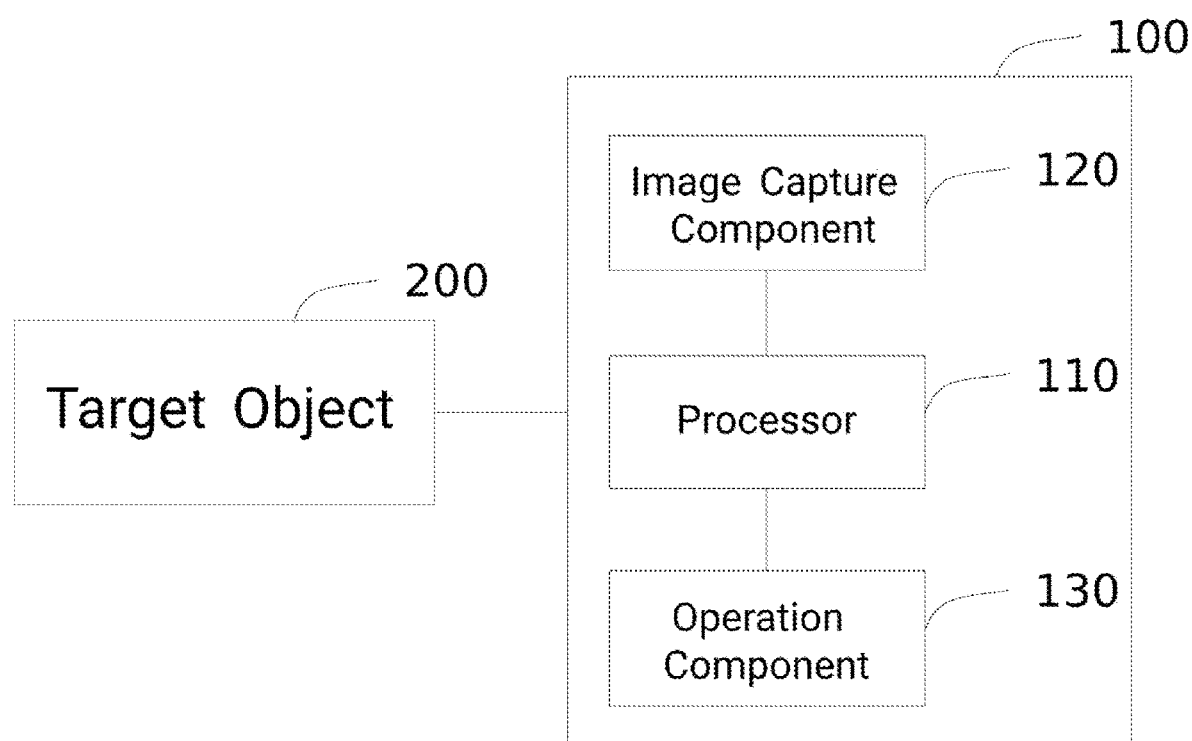
FIG. 2 illustrates a schematic diagram of an application of the dimensional measurement device based on deep learning according to an embodiment of the present disclosure.

FIG. 2 illustrates a schematic diagram of an application of a dimensional measurement method based on deep learning according to an embodiment of the present disclosure. As shown in FIG. 2, the dimensional measurement method based on deep learning is applied to an electronic device 100, and electronic device 100 includes a processor 110, an image capture component 120, and an operation component 130.

Image capture component 120 and the processor 110 may be similar to those discussed with respect to FIG. 1 above and include similar exemplary devices.

After processor 110 determines dimensional data of the target object 200, processor 110 may also control operation component 130 (such as a robotic arm) to perform actions such as grasping, positioning, adjusting, or direction adjusting of the target object based on the dimensional data.

Figure 3:
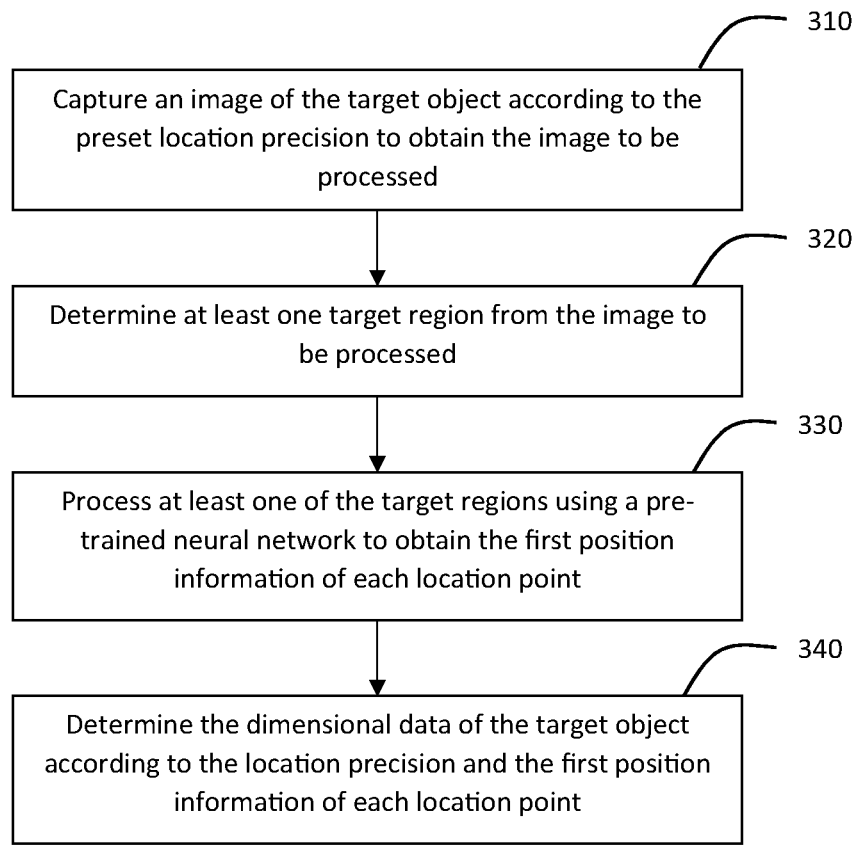
FIG. 3 illustrates a flowchart of the dimensional measurement method based on deep learning according to an embodiment of the present disclosure.

FIG. 3 shows a flowchart of the dimensional measurement method based on deep learning according to an embodiment of the present disclosure. As shown in FIG. 7, the said method comprises:

At step 310 a processor, for example, may capture an image of the target object according to the preset location precision to obtain the image by, for example, use a camera. In this example, the target object may include at least one of either industrial products (mobile phones, automobiles, etc.) or parts (mobile phone parts, automobile parts, etc.) produced in industrial manufacturing. The present disclosure does not limit the specific type of the target objects.

All problems of spatially measuring the target object can be converted into the problems of locating one or more location points of the target object. Based on this assumption, before spatially measuring the target object, at least one location point used in the measurement may be identified. Location points may be points, identified via a camera, which are spots or areas on a target object for which dimensional data is desired. Depending on what dimensions are needed, one or a plurality of location points may be identified to create dimensional data.

For example, when measuring a single location point. i.e., when measuring the position of one location point on the target object, that point is used as the location point; when measuring the length of one side of the target object, the two endpoints of the side are used as location points; when measuring an arc or a circle on the target object, at least three location points on the arc or circle can be used as location points; when measuring features such as the area or circumference of the target object, all vertices of the object can be used as location points. Thus, any point on a target object may be specified as an location point. However, unique portions of a target object may be more desirable to designate as location points than other portions of a target object. For example, a screw hole, a corner, an edge, a radius, a post, an extension, a depression, or any other element of a target object may be designated as a location point or one or more than one of these points may be designated as a location point. In this manner, a processor using deep learning techniques may identify one or more location points of the target object to measure the target object. In one example, this measurement may determine whether or not the target object satisfies specifications for the target object, such as being within a particular tolerance for a size of a part or the like. The target object may be accepted or rejected based on the measurement of the part. In another embodiment, the orientation of the part may be known such that the part may be manipulated by robotic control to be appropriately positioned for further manufacturing, such as a pick and place procedure, a circuit element population procedure, or assembly of one or more parts together.

When measuring a point, a line, a face, or a shape of the target object in three-dimensional space, the location points can be determined in a manner similar to the above.

It should be noted that those skilled in the art may manually set the location points of the target object according to actual conditions, and the present disclosure limits neither the number of location points on the target object nor the method in setting these points.

In a possible implementation, the location precision of each location point on the target object may be determined according to the accuracy requirements of a measurement task for deriving and obtaining dimensional data. The location precision of each location point may be characterized as the closeness of the prediction to the actual Euclidian distance between two location points. In other words, if a particular location point is expected to be an exact measurement away from another location point (e.g., 15.341 mm away), the location precision may be within a particular tolerance to ensure that deriving and obtaining dimensional data about a target object is correct. The location precision may be used to indicate the imaging resolution of the location points used when measuring the target object within an image. The location precision of each location point may be the same or different, and the present disclosure does not limit this. The location precision of the target object may indicate an accuracy of the dimensional data based on a resolution, e.g., imaging resolution, of an image. Typically, images taken with higher resolution may be more accurately measured and, therefore, enjoy a higher location precision.

In a possible implementation, when only one location point is used when measuring the target object, the location precision of the location point can be directly determined as a preset location precision. That is, once a location point is determined for a particular part, it may become a preset location point with a preset location precision for subsequent identification and measurement of similar parts.

In a possible implementation, when a plurality of location points is used when measuring the target object, the minimum location precision of the plurality of location points may be determined as the preset location precision.

For example, when the shape of the target object 200 is a cube, measuring the area of each surface of the target object 200 may use the four vertices on each face of the cube as location points. For this example, a target object A includes a face that has four location points (vertices) A1, A2, A3, and A4, and their location precisions are 2 um, 3 um, 5 um, 1 um, respectively. Since smaller number means higher location precision, the minimum value of 2 um, 3 um, 5 um, and 1 um, which is 1 um, may be set as the preset location precision when measuring the dimensions of the target object A.

Setting the minimum location precisions of the location points as the preset location precision will ensure that the preset location precision meets precision requirements of multiple location points, thereby improving the accuracy of locating a part.

In a possible implementation, after the preset location precision is determined, step 310 may use the image capture component, such as a camera or a webcam, to capture an image of the target object based on the location precision to obtain an image of the target object.

In a possible implementation, step 310 may comprise determining a field of view when capturing an image of the target object according to preset location precision and image capturing resolution and capturing an image of the target object to obtain an image of the target object. Image capturing resolution may refer to a resolution of the image capture component, such as the resolution of the camera or the webcam. A field of view for the image capture component refers to an area that the image capture component captures when taking image of the target object.

In a possible implementation, a range of the field of view when capturing image of the target object may be determined according to the preset location precision and image capturing resolution.

For example, assume that the image capture component is a camera, the absolute position of the camera is known (fixed), if a single point (one location point) needs to be location and the preset location precision is r, then, the Nyquist Theorem states that r should be captured by multiple pixels. Those skilled in the art may determine the minimum number of pixels to capture r according to actual conditions, and the present disclosure does not limit that number.

Assuming that r is covered by at least 4 pixels, and each pixel represents a square of size $r_p \times r_p$ in the actual space (where $r_p$ is the length of each side), then $4 \times r_p \leq r$. Based on this, assume that the pixels of the camera (the image capturing pixels) are w×h (width×height of the pixels), and the field of view is a×b, (width×height of the field of view or total pixels available within an image sensor, for example) then the spatial distance of the actual positions corresponding to each pixel of the camera $r_p$ should satisfy the following equation (1):

$$r_p = \max(a/w, b/h) \leq r/4 \quad (1)$$

In equation (1), w represents the number of pixels of the camera in the horizontal direction (each row), and h represents the number of pixels of the camera in the vertical direction (each column).

When w, h, r, and $r_p$ are known, the maximum value of a,b can be determined by the above equation (1), and the maximum value of a×b can set as the field of view when capturing an image of the target object, where a represents the length of the field of view, and b represents the width of the field of view.

In a possible implementation, when the distance between two points on the target object (for example, Euclidean distance) is measured, and the standard deviation of the distance between the two points is required to be d, these two points can be chosen as location points, and the location precision r of each location point is set to $d/\sqrt{2}$.

In the case where the location precision r is $d/\sqrt{2}$ and the resolution of the camera is w×h, the above equation (1) can be used to determine the range of the field of view when capturing image of the target object.

In a possible implementation, when a plurality of location points is used when measuring the target object, the minimum location precision of the plurality of location points may be determined as the preset location precision, and equation (1) may be used to determine the range of the field of view when capturing image of the target object.

When measuring a point, a line, a face, or a shape of the target object in three-dimensional space, the location points may be determined in a similar manner to the above, i.e., equation (1) may be used to determine the range of the field of view when capturing image of the target object. It should be noted that those skilled in the art may also determine the field of view in other ways, and the present disclosure does not limit the methods.

In a possible implementation, after determining the field of view, the image capture component may be adjusted according to this field of view. Possible adjustments include changing the camera's lens, focal length, and other parameters, and the adjusted image capture component may be used to capture an image of the target object to obtain the image.

In a possible implementation, step 310 may further comprise determining the field of view when capturing image of the target object according to preset location precision and image capturing resolution and capturing an image of the target object to obtain the image to be processed based on the field of view, such that image capturing will meet a location precision requirement and increase the accuracy of the image of the target object.

Step 320 determines at least one target region from the image of the target object. To reduce calcualtional load of the neural network and improve the accuracy of the result, before the neural network determines the position information of each location point, at least one target region may be determined from the image of the target object. The target region indicates the area where the location points are in the image of the target object. Each target region includes at least one location point. This means that there are one or more location points in each target region. In other words, the target region is a region including at least one location point in the image to be processed.

In a possible implementation, for any location point, a minimum area that the location point may appear in the field of view can be determined as a range of positions of the location point. If the minimum area of the location point in the field of view is determined in advance, for example, experience may determine the minimum area of the location point in the field of view, then the range of positions of the location point is considered to be known. If it is not possible to determine in advance the smallest area where the location point appears in the field of view, then the location point may appear in any area within the field of view, and in this case the range of positions of the location point is considered to be unknown. That is, depending on how a part is placed within the field of view, a particular location point on that part may be known in advance. After a certain number of times placing the part within the field of view, a variation in the same location point on each subsequently placed part may indicate, over time, that a particular location point may be location within a particular area of the field of view. When the area of a field of view that particular location point will be location on a new part is known, neural network processing may be reduced. However, when the area of a field of view for that particular location point is not known or cannot be known, a processor may consider the area of the field of view as an unknown variable in deriving dimensional information.

In a possible implementation, when the range of positions (area of a field of view) of the location points is known, and the number of location points used in measuring the target object is 1, the region corresponding to the range of positions of the location point in the image to be processed is determined as the target region. For example, suppose the number of location points used when measuring the target object is 1, which is represented as location point B. The range of positions of location point B is known to be within an area C determined by the coordinates $(x_{min}, y_{min})$ and $(x_{max}, y_{max})$ within the field of view. The area corresponding to the range of positions of the location point (i.e., area C in the field of view) in the image to be processed may be determined as the target region, where $x_{min} < x_{max}$, $y_{min} < y_{max}$.

When the range of positions of the location point is known, and one location point is used, the region corresponding to the range of positions of the location point in the image to be processed is directly determined as the target region. This simple and fast method improves processing efficiency.

In a possible implementation, when the range of positions of the location points is known, and the number of location points used is greater than 1, a processor may determine a target region according to the range of positions of each location point by using multiple selection methods and then respectively determining the total area of the target regions under each method. The selection method with the smallest total area is chosen as the target selection method. Then, the processor determines at least one target region from the image of the target object based on the target selection method target region.

Under normal circumstances, the computational load for image processing based on deep learning is proportional to the size of the image; that means, the larger the image, the greater the amount of calculation required to process the image. The size of the image is usually proportional to the area of the image.

On this basis, in order to reduce the computational load of the neural network and improve the accuracy of the results of generated by the neural network; when the range of positions of the location points are known; and the number of location points used when measuring the target object is greater than 1, the processor may determine the target region according to the range of positions of each location point by using multiple selection methods. The processor then respectively determines the total area of the target regions using each method and sets the selection method for the target region with the smallest total area as the target selection method for a particular part.

For example, suppose that the range of positions of the location points are known, and the number of location points used when measuring the target object is 2, which are respectively denoted as D1 and D2. A range of positions of D1 may be the region within the field of view determined by the coordinates $(x_{11}, y_{11})$ and $(x_{12}, y_{12})$, $x_{11} < x_{12}$ and $y_{11} < y_{12}$. The range of positions of D2 may be the region within the field of view determined by the coordinates $(x_{21}, y_{21})$ and $(x_{22}, y_{22})$, $x_{21} < x_{22}$ and $y_{21} < y_{22}$.

Multiple selection methods of the target region may be determined by different combinations of location point D1 and the location point D2:

The first method in selecting the target region works when location points D1 and D2 are in the same target region, E1 in the field of view, such that E1 contains the location points D1 and D2 according to the range of positions of the location points D1 and point D2. E1 is the region determined according to the coordinates $$\left(x_{min'_i}, y_{min'_i}\right) \text{ and } \left(x_{max'_i}, y_{max'_i}\right).$$

The region in the image of the target object that corresponds to E1 in the field of view may be set as the target region F1, where $$x_{min'_i} = min(x_{11}, x_{21})_i, \quad x_{max'_i} = max(x_{12}, x_{22})_i,$$

$$y_{min'_i} = min(y_{11}, y_{21})_i, \quad y_{max'_i} = max(y_{12}, y_{22})_i.$$

The second method in selecting the target region works when location points D1 and D2 are in different target regions. The range of positions of the location point D1 may be determined to be within field of view E2 (the region in the field of view determined by the coordinates $(x_{11}, y_{11})$ and $(x_{12}, y_{12})$). The region of the target within field of view E2 may be a target region F2. The range of positions of the location point D2 may be determined to be within field of view E3 (the region in the field of view determined by the coordinates $(x_{21}, y_{21})$ and $(x_{22}, y_{22})$). The region of the target within field of view E3 may be a target region F3.

The processor may determine a total area of the target region under various selection methods. In the first method, the total area of the target region is S1 and the area of the target region F1. In the second method, the total area of the target regions is S2 and the sum of the areas of the target regions F2 and F3. By calculation or comparison, set the selection method with the smallest area S=min (S1, S2) from a plurality of selection methods may be identified as the target selection method. Then, based on this target selection method, image segmentation or other techniques may be applied to determine at least one target region from the image of the target object.

It should be noted that the above example only uses the case of two location points as an example to illustrate how to determine the target region. Those skilled in the art should understand that when the target object includes multiple location points, the method for determining the target region is similar to the above and need not be elaborated here.

By choosing a region with the smallest total area and selecting at least one target region from the image to be processed, this method reduces the total area of the target region and increases the subsequent processing efficiency of the neural network.

In a possible implementation, when the range of positions of the location point of the target object is unknown, a processor may downsample the image to be processed according to a preset downsampling ratio to obtain an intermediate image. The intermediate image is the downsampled image of the target object. The processor may then determine second position information of each location point in the intermediate image by location positioning or other techniques and determine third position information of each location point according to the second position information. The third position information indicates the position information of the location points in the image to be processed as they correspond to their second position information. The processor may then determine one target region from the image of the target object according to the third position information. The processor may identify a preset size of the image which indicates a size of the region in the image where the location points appear in the image of the target object.

For example, suppose the image to be processed is P, and the preset downsampling ratio is $C_{down}$. When the location range of the target object's location points is unknown, the image may be downsampled to be processed P on both the length and width directions according to the downsampling ratio $C_{down}$ to obtain an intermediate image P'. That is, the intermediate image P' is the downsampled image of the image to be processed P.

The location precision of the intermediate image P' is $r'=r\times C_{down}$, the computational load when the neural network processes the intermediate image P' is $O'=O/(C_{down}\times C_{down})$, O represents the computational load when the neural network processes the image to be processed P.

At this point, the processor may determine second position information of each location point in the intermediate image P' separately by techniques such as target positioning. Since the positioning is performed on the intermediate image P' (the downsampled image of the image to be processed), this positioning can be regarded as a rough positioning. Compared with the image to be processed P, although this method loses some location precision, it is faster in positioning and improves processing efficiency.

After obtaining the second position information of each location point, the processor determines third position information of each location point in the image to be processed P, according to the positional correspondence between pixels of the intermediate image P' and the image to be processed P. The third position information can be regarded as the rough position information of each location point in the image to be processed P.

Then, the processor may determine at least one target region from the image of the target object to be processed P according to the third position information of each location point and the preset size, so that each location point can be accurately positioned in step 330. Wherein the preset size indicates the size of the region where the location points appear in the image of the target object to be processed.

For example, assume that third position information of a certain location point is represented by coordinates $(x_1, y_1)$ in the image to be processed P, and the preset size of the image is $2\times C_{down}$, then, from the image of the target object to be processed P. The processor may determine region F' according to the coordinates $(x_1-C_{down}, y_1-C_{down})$ and $(x_1+C_{down}, y_1+C_{down})$ and set a region larger than or equal to F' as the target region that includes the location point.

In a possible implementation, after obtaining the target regions that include all location points, a method similar to that described above may be used to combine each target region to obtain at least one final target region with a minimum total area.

When the range of positions of the location points of the target object is unknown, the processor may reduce the image to be processed, conduct rough positioning, and determine at least one target region from the image to be processed according to the result of the rough positioning. In this way, when the location points are not clearly defined, using rough positioning to determine the target region that includes the location points improves accuracy.

Step 330 processes at least one of the said target regions using a pre-trained neural network to obtain the first position information of each location point. The pre-trained neural network may include at least one sub-network. Optionally, the number of sub-networks in the neural network may be the same as the number of target regions such that each target region corresponds to and is processed by a dedicated sub-network. The sub-network may be a neural network based on deep learning, such as a convolutional neural network (CNN). The present disclosure does not limit the number and specific types of sub-networks.

In a possible implementation, the sub-networks may include both encoders and decoders. Wherein an encoder extracts features of the input target region, and an encoder may include multiple convolutional layers; the encoder may spatially cover the input target region with a large enough field of view and perform feature extraction by reducing the space size and increasing channels. The decoder may be used to determine position information of each location point, and the decoder may include multiple convolutional layers.

In a possible implementation, step 330 may further comprise: for any target region, performing feature extraction on the target region by using an encoder in the sub-network that corresponds to the target region, to obtain the feature map of the said target region and processing the feature map by using the decoder in the sub-network that corresponds to the target region to obtain the first position information of each location point in the said target region.

For any target region, assume it has a size $w'\times h'\times c'$, whereas $w'$ represents the width of the target region, $h'$ represents the height of the target region, and c represents the number of channels of the target region. If the camera used for capturing an image is a grayscale camera, then $c'=1$, if the camera is a color camera, then $c'=3$. The image of the target object may be loaded into the encoder that corresponds to the sub-network for feature extraction to obtain the feature map of the target region, the size of which is $w_e'\times h_e'\times c_e'$, where as $w_e'$ represents the width and $h_e'$ represents the height of the feature map of that target region, $c_e'$ represents the number of channels in the feature map of the target region, where, $w_e'<w'$, $h_e'<h'$, $c_e'>c'$ and $(w_e'\times h_e'\times c_e') <(w'\times h'\times c')$.

For any convolutional layer in the encoder, assume that a size of the input feature map is $w_{e1}'\times h_{e1}'\times c_{e1}'$, and the size of the output feature map is $w_{e2}'\times h_{e2}'\times c_{e2}'$, whereas $w_{e1}'$ represents the width of the input feature map of the convolutional layer, $h_{e1}'$ represents the height of the input feature map of the convolutional layer, $c_{e1}'$ represents the number of channels of the feature map of the input of the convolutional layer, $w_{e2}'$ the width of the feature map of the output of the convolutional layer, $h_{e2}'$ the height of the output feature map of the convolutional layer, $c_{e2}'$ the number of channels in the output feature map of the convolutional layer, then, $w_{e2}'\leq w_{e1}'$ and $h_{e2}'\leq h_{e1}'$. Therefore, the forward propagation of the encoder may be regarded as the process of compressing the image (the target region).

After obtaining the feature map of the target region, the feature map may be processed by the decoder in the sub-network corresponding to the target region to obtain the position information of each location point in the target region. For example, the feature map of the target region (size $w_e'\times h_e'\times c_e'$) may be loaded into the decoder in the sub-network corresponding to the target region, and the decoder may process the input feature map to obtain the position information of each location point in the target region.

For any convolutional layer in the decoder, assume that the size of the input feature map is $w_{d1}'\times h_{d1}'\times c_{d1}'$, and the size of the output feature map is $w_{d2}'\times h_{d2}'\times c_{d2}'$, whereas $w_{d1}'$ represents the width of the input feature map of the convolutional layer, $h_{d1}'$ represents the height of the input feature map of the convolutional layer, $c_{d1}'$ represents the number of channels of the feature map of the input of the convolutional layer, $w_{d2}'$ the width of the output feature map of the convolutional layer, $h_{d2}'$ the height of the output feature map of the convolutional layer, $c_{d2}'$ the number of channels in the output feature map of the convolutional layer, then, $w_{d2}' \leq w_{d1}'$ and $h_{d2}' \leq h_{d1}'$.

Determining the first position information of each location point by using the encoder and the decoder improves not only the processing efficiency but also the accuracy of the first position information.

At step 340 the processor determines the dimensional data of the target object according to the location precision and the first position information of each location point.

In a possible implementation, the dimensional data of the target object may be determined according to the preset location precision and the first position information (for example, coordinates) of each location point. The dimensional data of the target object may include at least one of the following measurements of the target object: length, width, height, curvature, radian, or area.

It should be noted that the dimensional data of the target object may also include other size-related information that may be measured in space. Those skilled in the art may determine the specific dimensional information of the target object, and the present disclosure does not limit the types of measurements and dimensional information that can be obtained using the techniques described herein.

The embodiments of the present disclosure include a processor that captures an image of the target object according to the preset location precision to obtain the image to be processed, and determines at least one target region from the image to be processed, with each target region including at least one location point, then processes at least one target region by using a pre-trained neural network to obtain the first position information of each location point, and determines the dimensional data of the target object according to the location precision and the first position information of each location point, thereby improving the repeatability and accuracy of locating and measuring a target object through deep learning, and in turn, improves the accuracy of the dimensional measurement result (the dimensional data of the target object).

In a possible implementation, the method further comprises: the processor training the neural network according to a preset training set, wherein the training set includes a plurality of sample images and label of each sample image, and the label includes reference position information of each location point in the sample image.

In a possible implementation, the neural network may include at least one sub-network. For any sub-network, it is possible to load the sample set and multiple sample image corresponding to the sub-network into the sub-network for processing to obtain the location information of the location points in each sample image, and for each sample image, determine the difference between the location information and the label of each location point. From determining the difference between the location information and the label of each location point the network loss of the sub-network may be determined. The parameters of the sub-network may be adjusted according to the network loss to improve accuracy and location information. When this process is repeated multiple times, the sub-network may become trained to look for one or more location points within the target image in a smaller and smaller area until a minimally small area is identified where the location points will always be location within the field of view of an image capture component.

In the case that each sub-network in the neural network meets the preset training termination condition, the processor may end the training to obtain the trained neural network. Examples of meeting the preset training termination condition may be that the network loss of the sub-network converges within a certain threshold, or the sub-network passes the validation test using a preset validation set. It should be noted that those skilled in the art can set the training termination condition according to actual conditions, and the present disclosure does not limit the conditions that may be set for training termination. Using a preset training set to train the neural network improves the accuracy of the neural network and therefore, the accuracy of dimensional measurement result (the dimensional data of the target object).

Figure 4:
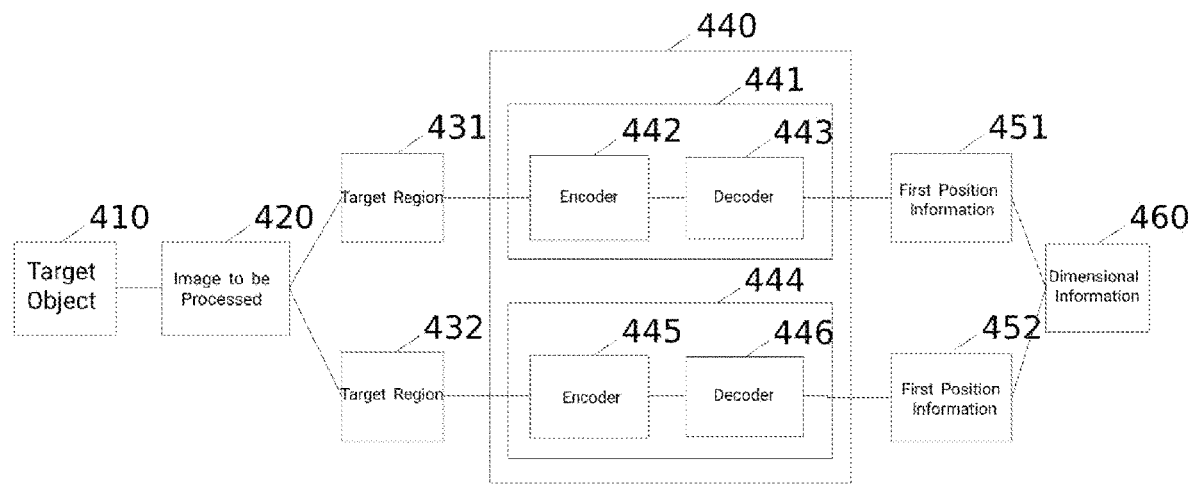
FIG. 4 illustrates a schematic diagram of the processes of the dimensional measurement method based on deep learning according to an embodiment of the present disclosure.

FIG. 4 shows a schematic diagram of the processes of the dimensional measurement method based on deep learning according to an embodiment of the present disclosure. As shown in FIG. 4, measuring the dimension of the target object 410 requires measuring a radian of a target object and uses three location points. The method first captures an image of the target object 410 according to a preset location precision to obtain the image 420, the image of the target object to be processed. Then, a processor determines two target regions from image 420: target regions 431 and 432, wherein target region 431 includes two location points, and 432 includes one location point.

After the determining target region, the pre-trained neural network 440 may process the target regions 431 and 432 to obtain the first position information of each location point. The neural network 440 includes two sub-networks, sub-networks 441 and 444.

The sub-network 441 processes the target region 431 by extracting features of the target region 431 through the encoder 442 to obtain the feature map of 431, and then uses the decoder 443 to process the output of the encoder 442 (the feature map of the target region 431), to obtain the first position information 451 of the two location points in the target region 431.

The sub-network 444 processes the target region 432 by extracting features of the target region 432 through the encoder 445 to obtain the feature map of 432. Sub-network 44 then uses the decoder 446 to process the output of the encoder 445 (the feature map of the target region 432), to obtain the first position information 452 of the one location point in the target region 432.

Then, a processor within pre-trained neural network 440 determines dimensional data 460 (for example, the radian measurement of the target object) of the target object according to the preset location precision, the first position information 451, and the first position information 452.

It should be noted that the above only uses the case of two target regions (431 and 432) as an example to illustrate embodiments of the techniques disclosed herein for dimensional measurement based on deep learning. Those skilled in the art should understand that the number of target regions shown in FIG. 4 may be another number, such as 3, 5, 10, or as many numbers as necessary to provide computational and processing efficiency for obtaining dimensional data. That is to say, those skilled in the art can set the specific number of target regions according to actual conditions, and the present disclosure does not limit that number.

The dimensional measurement method based on deep learning described in the embodiments of the present disclosure can automatically learn to solve the problem of measuring dimensions of a target object through deep learning. This dimensional measurement method is strongly robust to changes in factors such as environment and materials, has high repeatability and accuracy of positioning, and therefore increases the accuracy of the dimensional measurement results.

In addition, when the location points of the target object are not clearly defined, the dimensional measurement method based on deep learning described in the embodiments of the present disclosure can determine the target region of an image that includes the location point through rough positioning, and then further locate the target region (fine positioning) to determine the position information of each location point, so as to improve the accuracy of positioning, thereby improving the accuracy of the dimensional measurement results.

It should be understood that the various method embodiments mentioned in the present disclosure can be combined with each other to form combined embodiments without violating the principle and logic. Other embodiments that are not explicitly disclosed but are within the scope of this disclosure may be apparent based on this disclosure.

Those skilled in the art should understand that, in implementing the above methods, the written order of the steps does not mean a strict order in execution, nor does that order pose any limitation on the implementation. The specific execution order of each step should be determined based on their functions and possible internal logic.

In addition, the present disclosure also provides a dimensional measurement device and a computer-readable storage medium, both based on deep learning, and both can be used to implement any of the above-mentioned deep learning-based dimensional measurement methods provided in the present disclosure. For the corresponding technical solutions and descriptions, refer to the corresponding technical descriptions and will not be repeated here.

Figure 5:
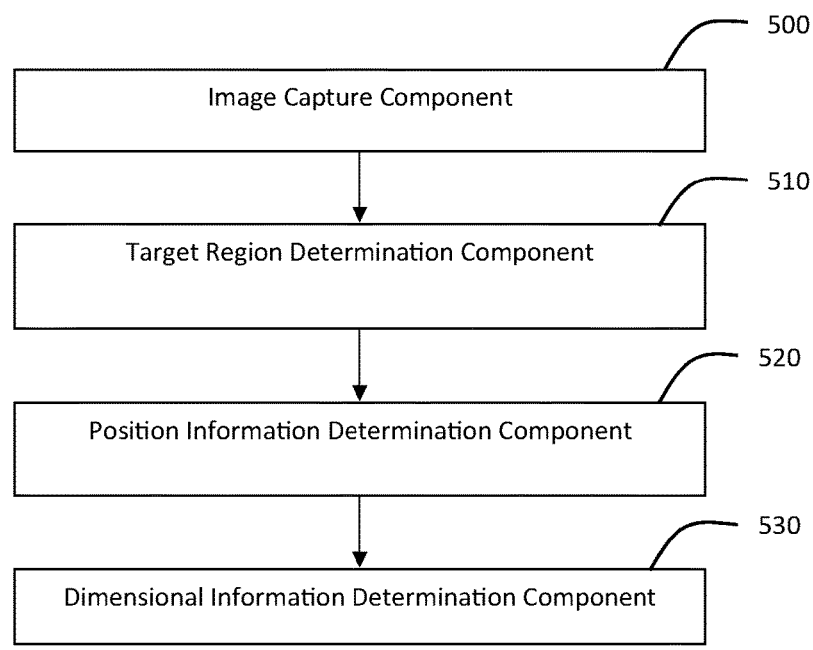
FIG. 5 illustrates a block diagram of the dimensional measurement device based on deep learning according to an embodiment of the present disclosure.

FIG. 5 shows a block diagram of the dimensional measurement device based on deep learning according to an embodiment of the present disclosure. As shown in FIG. 5, the device comprises image capture component 500, which captures an image of the target object according to the preset location precision to obtain the image of the target object to be processed. The prescribed location precision indicates the imaging resolution of the location points used in measuring the target object. The device further includes a target region determination component 510, which determines at least one target region from the image of the target object to be processed, with each target region including at least one location point. The device may further include position information determination component 520, which processes at least one of the said target region using a pre-trained neural network to obtain the first position information of each location point. The device may also include a dimensional data determination component 530, which determines the dimensional data of the target object according to the location precision and the first position information of each location point.

The embodiments of the present disclosure provides a device that captures an image of the target object according to the preset location precision to obtain the image of a target object to be processed. The device determines at least one target region from the image to be processed, with each target region includes at least one location point, and then processes at least one target region by using a pre-trained neural network to obtain the first position information of each location point. The device then determines the dimensional data of the target object according to the location precision and the first position information of each location point, thereby improving the repeatability and accuracy of location and measuring the target object through deep learning. This location and measuring of the target object, in turn, improves the accuracy of the dimensional measurement result (the dimensional data of the target object).

In a possible implementation, the said neural network includes at least one sub-network, with the said sub-network corresponds to the target region. The sub-network includes an encoder and a decoder. The position information determination component 520 comprises a feature map determination sub-component, which processes the feature map using the encoder in the sub-network corresponding to the target region to obtain the feature map of the said target region. First position information determination component 520, processes the feature map by using the decoder in the sub-network corresponding to the target region, to obtain position information of each location point in the target region.

In a possible implementation, the target region determination component 510 comprise a first region determination subcomponent. When the range of positions of the location points is known, and the number of location points used in measuring the target object is one, the first region determination subcomponent may determine the region corresponding to the range of positions of the location point in the image to be processed as the target region. The range of positions indicates the smallest area where the location points appear in the field of view, and the field of view range indicates the range when the imaging component captures an image of the target object.

In a possible implementation, the target region determination component 510 further comprises a first selection method determination subcomponent 530. The first selection method determination subcomponent 530 determines the multiple selection methods based on the range of positions of each location point when the range of positions of the location points is known, and the number of location points used in measuring the target object is greater than one. The total area determination subcomponent respectively determines the total area of the target regions under each method. A second selection method determination subcomponent may identify the smallest total area as the target selection method. The second region determination subcomponent may also determine at least one target region from the image to be processed by using the target selection method.

In a possible implementation, the target region determination component 510 further comprises a sampling subcomponent. The sampling subcomponent downsamples the image to be processed according to a preset down-sampling ratio to obtain the intermediate image when the range of positions of the location points is unknown. A second position information determination component may determine, respectively, second position information of each location point in the intermediate image. A third position information determination component may determine a third position information of each location point in the image to be processed according to the second position information. The third position information indicates the position of the location points in the image to be processed with their position information corresponding to the second position information. A third region determination component may determine one target region from the image to be processed according to the third position information of each location point and the preset size.

In a possible implementation, the said image capture component 500 comprises a field of view determination subcomponent. The field of view determination subcomponent may determine the field of view when capturing an image of the target object according to preset location precision and image capturing resolution. The image capture subcomponent 500 may capture an image of the target object to obtain the image to be processed.

In a possible implementation, the device further comprises a location accuracy determination component. The location accuracy determination subcomponent sets a minimum value of the location precision of the multiple location points as the preset location precision when multiple location points are used in measuring the target object.

In a possible implementation, the target object includes at least either an industrial part or an industrial product, and the dimensional data includes at least one of the following measurements: length, width, height, curvature, radian, or area.

The embodiments of the present disclosure also provide a dimensional measurement device based on deep learning. The dimensional measurement device based on deep learning comprises a processor and a memory that stores instructions that are executable by the processor. The processor may implement the method of any one of the deep-learning-based dimensional measurement methods when executing instructions.

The embodiments of the present disclosure also proposes a computer-readable storage medium, which stores computer program instructions which may be are executed by a processor, to implement any of the above methods. The computer-readable storage medium may be a non-volatile computer-readable storage medium or a volatile computer-readable storage medium.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A dimensional measurement method based on deep learning, the method comprising:
    capturing, by a processor, an image of a target object according to a preset location precision to obtain an image, wherein the location precision indicates an imaging resolution of one or more location points used to measure the target object;
    determining, by a processor, at least one target region from the image, with each target region including at least one of the one or more location points;
    processing, by a processor, at least one target region using a pre-trained neural network to obtain first position information of each location point;
    determining, by a processor, dimensional data of the target object according to the location precision and the first position information of each location point;
    wherein when a range of positions of the location points is known, and a number of location points used in measuring the target object is greater than one:
    determining, by the processor, multiple selection methods that choose target regions, based on the range of positions of each location point;
    determining, by the processor, a total area of the target regions under the respective selection methods;
    set, by the processor, the selection method that has a smallest total area as the target selection method; and
    determining, by the processor, at least one target region from the image by the target selection method.

2. The method according to claim 1, wherein the neural network includes at least one sub-network that corresponds to the target region, and the said sub-network includes an encoder and a decoder, and the pre-trained neural network processes at least one target region to obtain position information of each location point, and wherein the processor performs feature extraction on the at least one target region by obtaining a feature map of the target region by the encoder in the sub-network corresponding to the target region; and wherein the processor processes the feature map to obtain position information of each location point in the target region by the decoder in the sub-network.

3. The method according to claim 1, wherein when the range of positions of the location points is known, and the number of location points used in measuring the target object is one, the processor identifies a region corresponding to a range of positions of the location point in the image as the target region, and wherein the range of positions of the location point indicates a smallest area where the location points appear in a field of view of the image, and the field of view indicates the target region captured when the image capture component captures an image of the target object.

4. The method according to claim 1, wherein determining by the processor at least one target region from the image to be processed, further comprises:
    when the range of positions of the location points is unknown, downsampling, by the processor, the image according to a preset downsampling ratio to obtain an intermediate image;
    determining, by the processor, second position information of each location point in an intermediate image;
    determining, by the processor, third position information of each location point in the image to be processed according to the second position information, wherein the third position information indicates the positions of the location points in the image to be processed, the position information of the location points in the image corresponding to the second position information; and
    determining, by the processor, at least one target region from the image to be processed, according to the third position information and preset dimensions.

* * * * *